Figure 1:
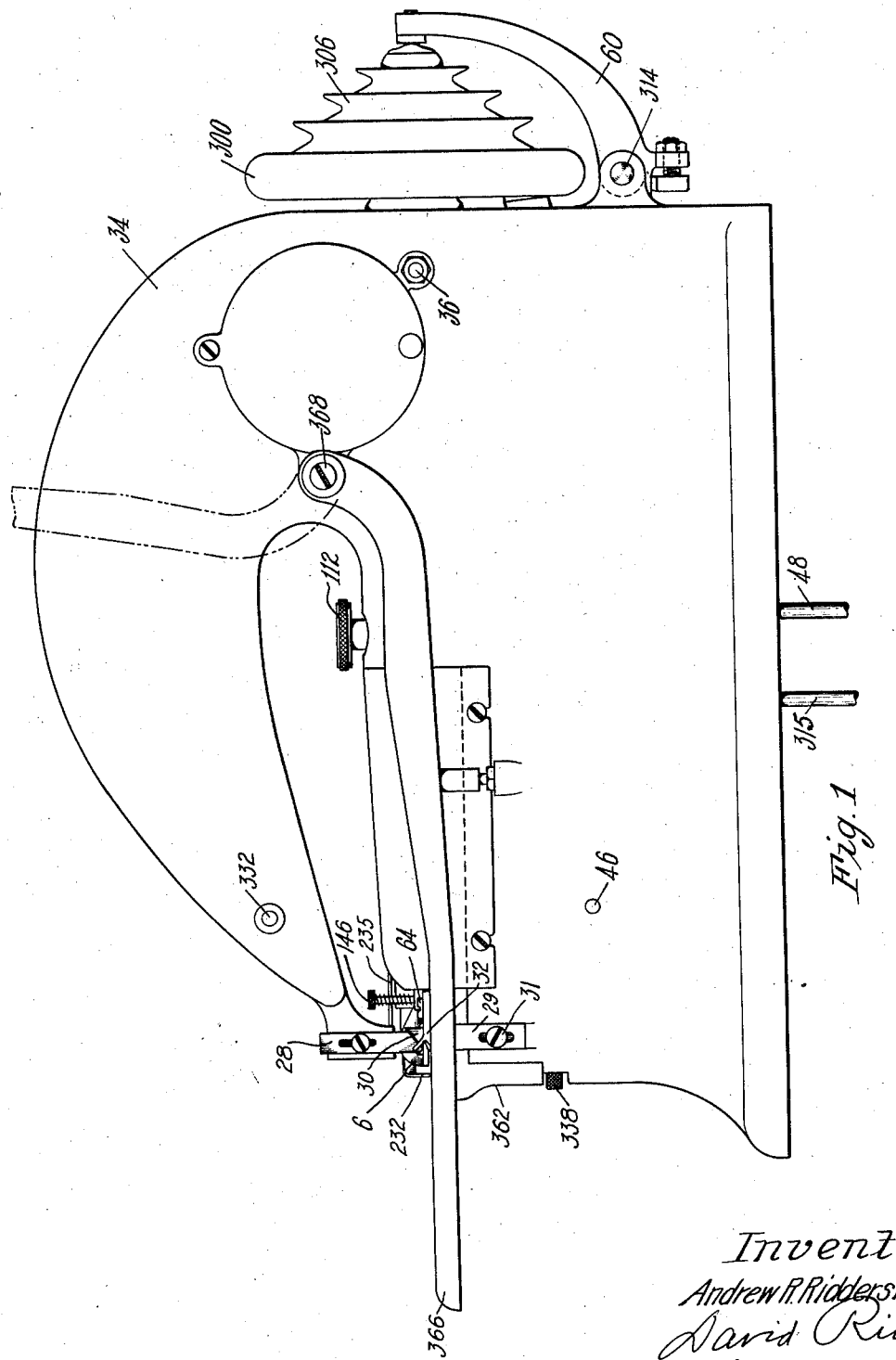

Feb. 24, 1925.

A. R. RIDDERSTROM 1,527,395

FOLDING MACHINE AND METHOD

Filed Jan. 21, 1920

8 Sheets-Sheet 1

Inventor:-
Andrew R. Ridderstrom
David Rines
Attorney:-

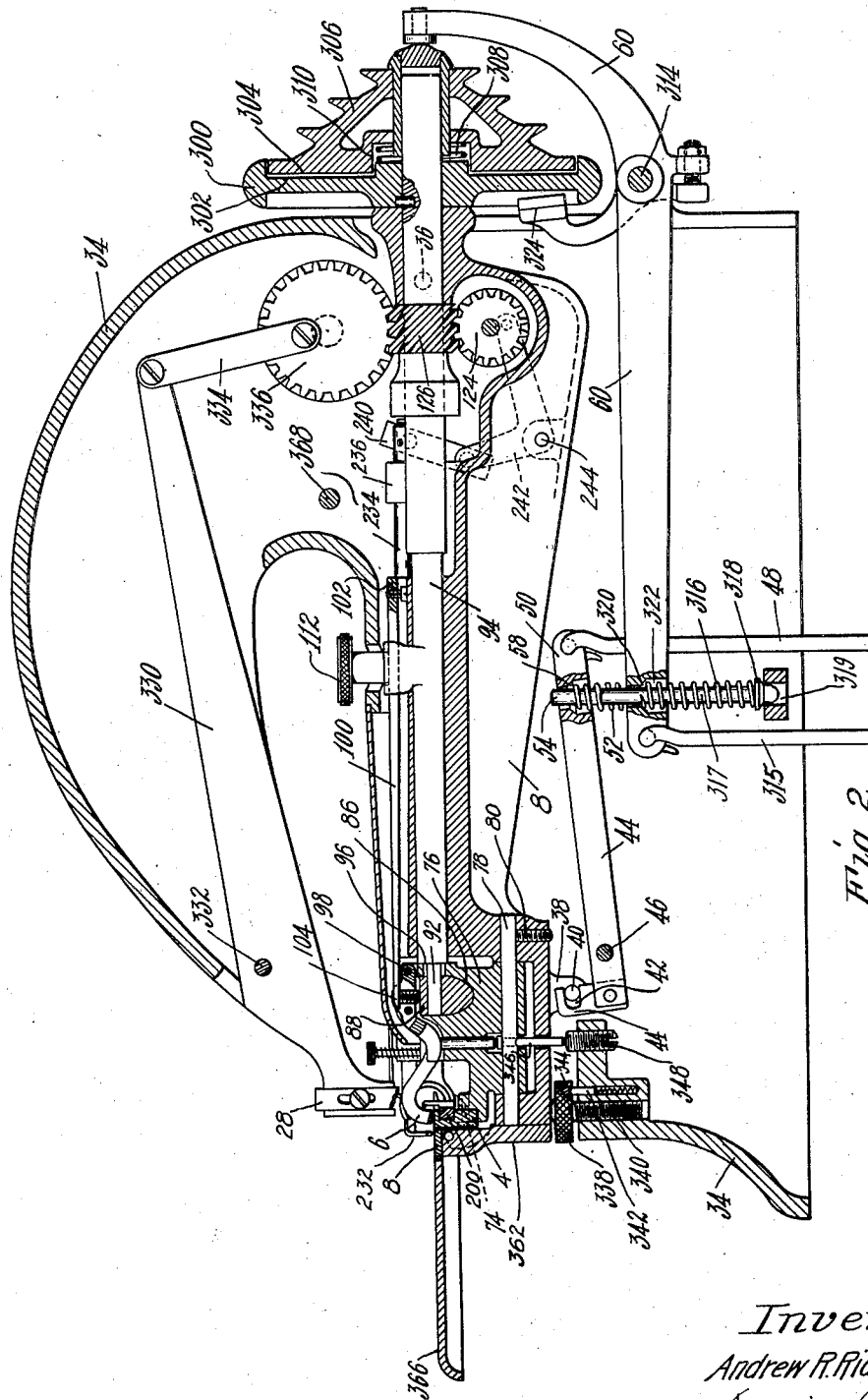

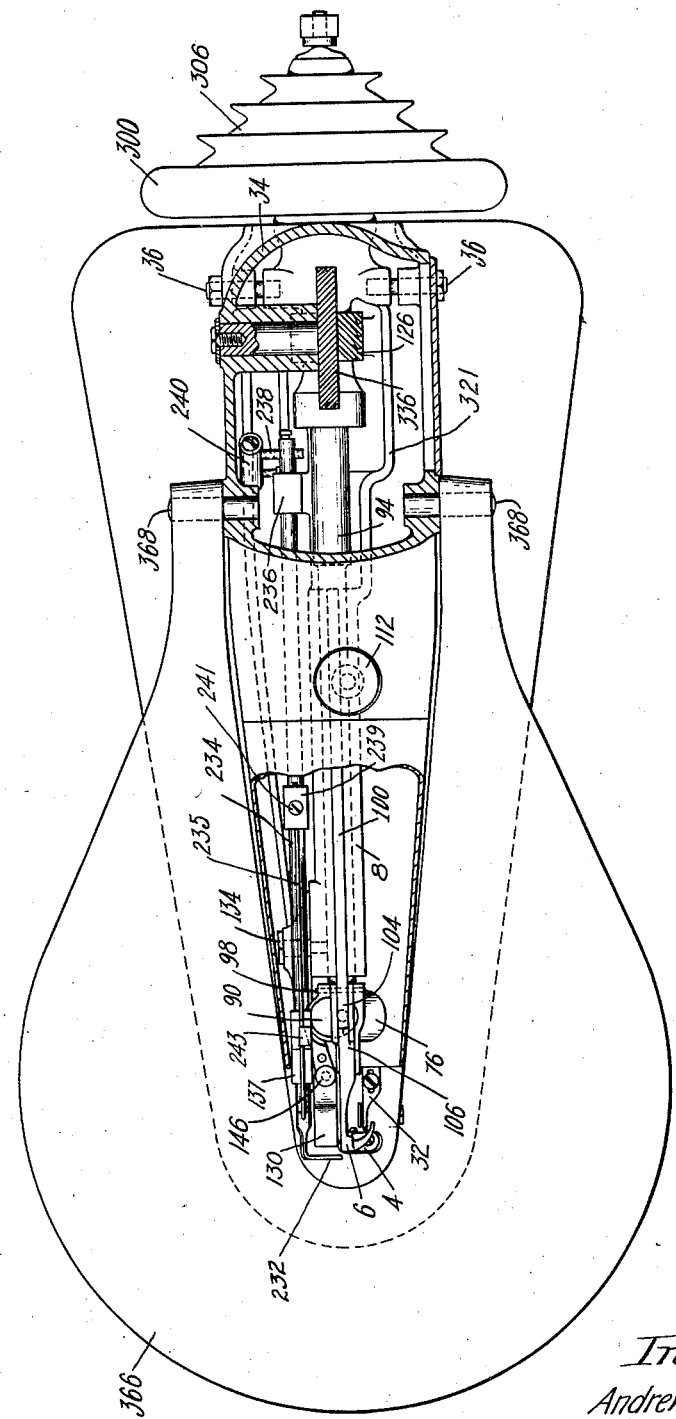

Feb. 24, 1925. 1,527,395
A. R. RIDDERSTROM
FOLDING MACHINE AND METHOD
Filed Jan. 21, 1920 8 Sheets-Sheet 4

Inventor:-
Andrew R. Ridderstrom
David Rines
Attorney:-

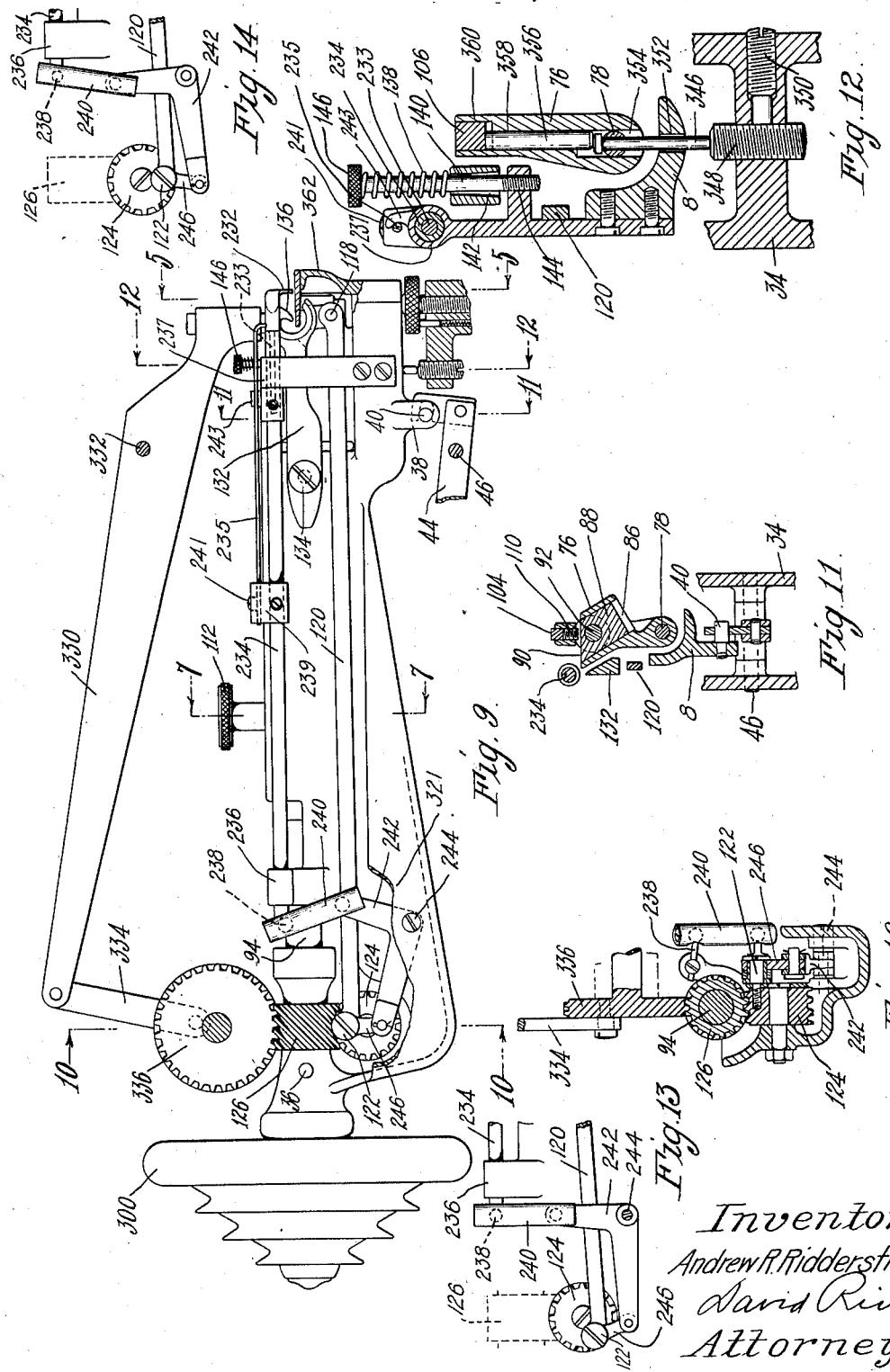

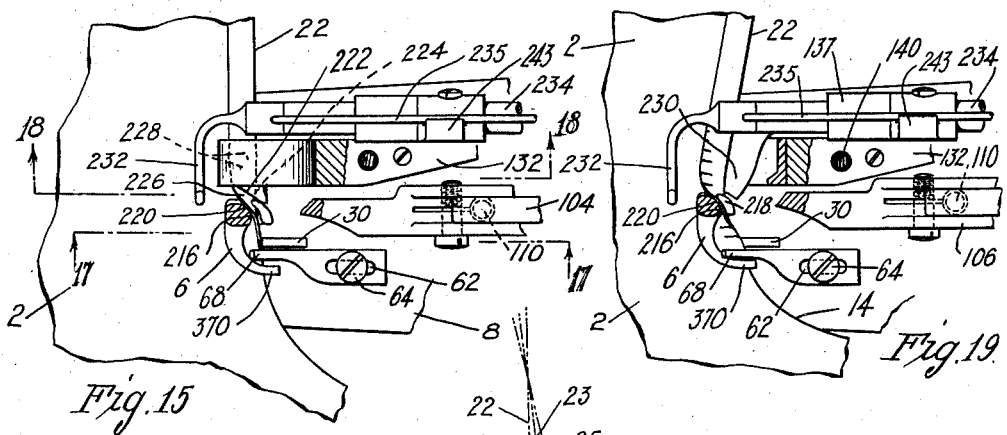

Feb. 24, 1925.

A. R. RIDDERSTROM 1,527,395

FOLDING MACHINE AND METHOD

Filed Jan. 21, 1920   8 Sheets-Sheet 7

Start Feeding

⅓ Feeding

⅔ Feeding

Inventor
Andrew R. Ridderstrom
David Rinos
Attorney:-

Stop Feeding

⅓ Return

⅔ Return

Patented Feb. 24, 1925.

1,527,395

UNITED STATES PATENT OFFICE.

ANDREW R. RIDDERSTROM, OF NAHANT, MASSACHUSETTS, ASSIGNOR, BY MESNE ASSIGNMENTS, TO BEACON FOLDING MACHINE COMPANY, OF LYNN, MASSACHUSETTS, A CORPORATION OF MASSACHUSETTS.

FOLDING MACHINE AND METHOD.

Application filed January 21, 1920. Serial No. 352,937.

*To all whom it may concern:*

Be it known that I, ANDREW ROBERT RIDDERSTROM, a citizen of the United States, and resident of Nahant, in the county of Essex and State of Massachusetts, have invented a new and useful Improvement in Folding Machines and Methods, of which the following is a specification.

The present invention relates to methods of and machines for operating upon flexible material, and more particularly to methods of and machines for folding the edges or margins of shoe uppers, such as vamps and tips.

In order to obtain a smooth edge fold, it is customary to snip the concave edges of the vamp or other upper preparatory to the folding operation, leaving the straight and convex edges unsnipped. The snips, moreover, should be of progressively increasing and decreasing length around the curve, so as to provide for a uniform fold throughout and to prevent the crimping or puckering which is usually found at the points where the snipping begins and ends when the snips are all of the same length. As folding machines, especially those of the short-feed type, operated at very high speed, it is desirable that all the high speed parts, including the snipping cutter, operate continuously. The above demands upon machines are very heavy, so that the machines hitherto proposed alleged to be capable of fulfilling these requirements have been clumsy and complex in structure, expensive to build and far from satisfactory in operation.

An object of the present invention, accordingly, is to provide a new and improved machine of the above-designated character which shall be simple to construct, cheap to manufacture, more efficient in operation and more durable.

A further object of the invention is to provide an improved method of operating upon flexible material, like shoe uppers.

With these ends in view, a feature of the invention resides in providing for advancing or feeding the straight and convex edges of a shoe upper at one side of a continuously operating cutter to a fold presser which presses them down to form folds, and progressively moving the concave edges of the upper into the path of the cutter so as to effect snips of progressively varying length therein before they are fed to the fold presser.

One of the most difficult operations connected with the use of folding machines is that of gaging the work as it is fed to the cutting and folding instrumentalities. This is because the same gage must necessarily be employed irrespective of the edge contour of the work. If the gage is properly adjusted for straight edge portions, for example, as it usually is, the operator must crowd the work against the gage by main force when a concavely curved portion of the work is encountered. If he crowds too hard or too lightly, the resulting fold will not be of the same dimensions as those on other portions of the work.

Another object of the invention is to provide a folding machine with a variable gage, so that different portions of the work may be differently gaged, as desired.

To this end, an inclined gage is provided in the specific embodiment of the invention which is herein illustrated and described, one portion of which is normally effective to gage such portions of the work as are folded without snipping, and another portion of which is effective to gage the concave edges, which it is desired to snip. The necessity for crowding the work against the gage is thereby obviated.

The feeding means should, of course, remain idle during the fold pressing operation and the fold presser should be ineffective during the feeding operation. The feeding means, furthermore, should continue to grip the work until after the fold presser has secured a firm grip thereon. The desired timing of the various operations has hitherto been approximately attained by the use of cams and springs. As cam-and-spring-controlled parts cannot operate efficiently at the high speeds demanded of folding machines, particularly with short-feed machines, the theoretical timing claimed for these machines has not been realized in practice.

It is a further object of this invention, therefore, to provide an improved folding machine with positive or all-lever connections the parts of which shall operate at high speed in the desired time relation.

To the attainment of this end, a feature of the invention contemplates operating the feed elements from a block constrained to move in a diagonal path.

It has hitherto been customary to provide the fold presser with a flat face which pressed down upon the work throughout its surface at one and the same time, producing, upon occasion, a wrinkled fold parts of which were not so well pressed as others.

It is, therefore, still another object of the invention to provide an improved fold presser for a folding machine, which shall operate to press the folds progressively from the edge of the fold inwardly.

To the accomplishment of this result, a feature of the invention resides in a curvilinearly-faced hammer which is adapted initially to pinch the very edge of the fold and then to roll over upon the fold, ironing it out smoothly.

In a copending application by Brostrom and Ridderstrom, Serial No. 201,564, filed November 12, 1917, there is disclosed a folding plow that moves with the feed elements and that operates to impart an initial fold to the edge of the stock during the rearward movement and a final fold during the forward movement which is later pressed down. It is found that the friction of the plow upon the stock in forming the initial fold during the rearward movement has a tendency to cause a wrinkling of the stock which produces an uneven edge fold.

It is accordingly a further object of the invention to improve upon the plow of the above-mentioned application.

To this end, a feature of the invention contemplates a plow which completely releases the work during its rearward movement, thus eliminating the source of wrinkling arising from the friction of the plow upon the work.

It is an object of the invention, also, to provide an improved retainer and connecting mechanism therefor for operating it in timed relation to the other operating parts.

Another object is to provide for removably mounting the folding mechanism in its frame so that it may readily be removed and remounted in another frame that is provided, or not provided, with a cutter, as may be desired.

With these and other objects in view, as will become apparent to those skilled in the art as the description proceeds, the invention consists of the improved folding machine hereinafter described, illustrated in the accompanying drawings, and defined in the appended claims.

Figure 7:
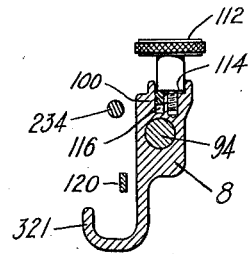
Figures 4, 23:
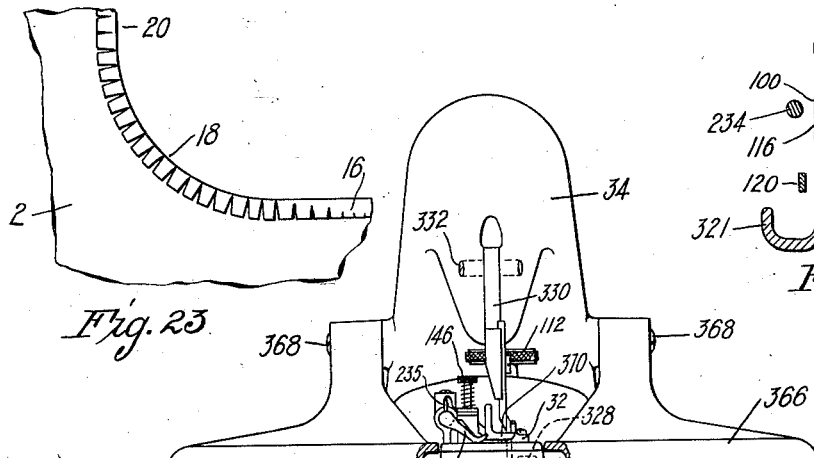
Figure 5:
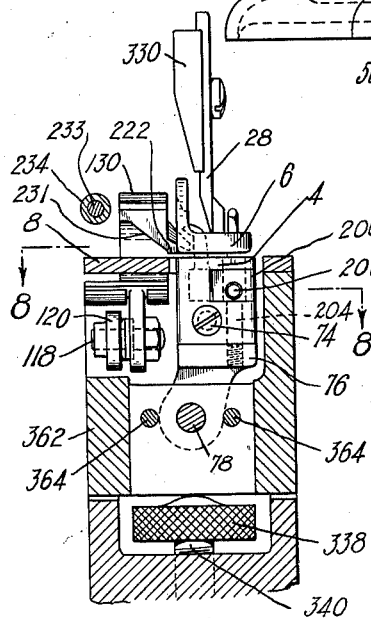
Figure 6:
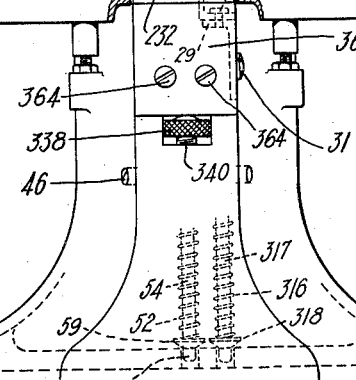
Figure 8:
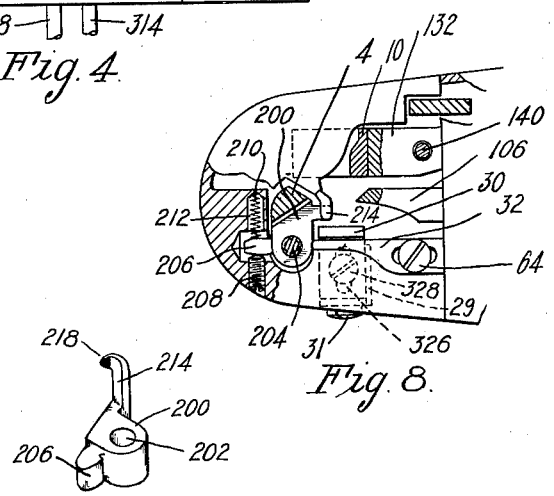
Figure 24:
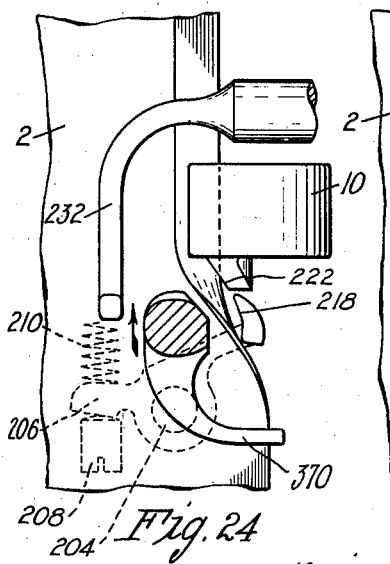
Figure 27:
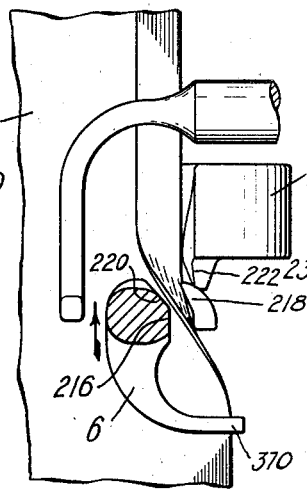
Figure 30:
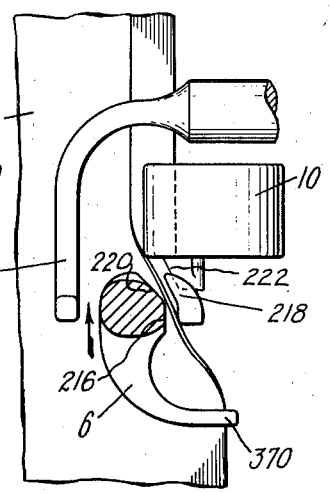
Figure 25:
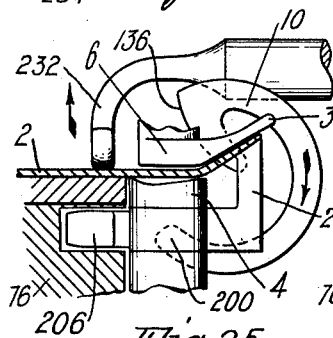
Figure 28:
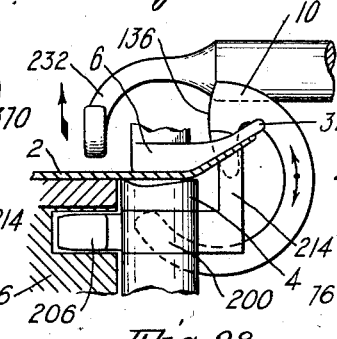
Figure 31:
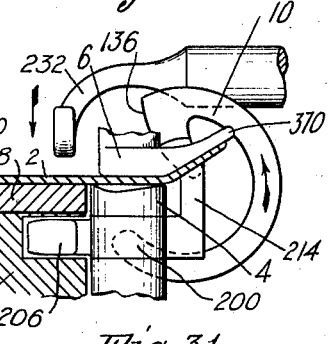
Figure 26:
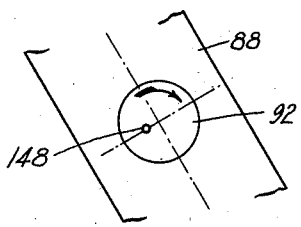
Figure 29:
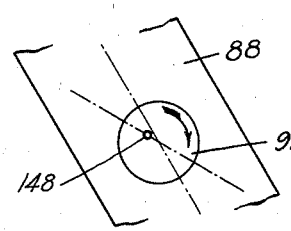
Figure 32:
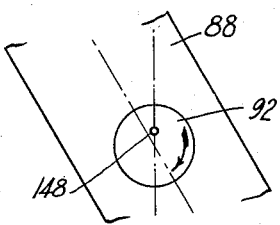

In the drawings, Fig. 1 is a view in side elevation of a machine constructed according to a preferred embodiment of the present invention; Fig. 2 is a central, longitudinal, sectional view thereof; Fig. 3 is a plan view, with parts broken away, to show the interior construction; Fig. 4 is an end elevation, with a portion broken away; Fig. 5 is a vertical sectional view, taken upon the line 5—5 of Fig. 9; Fig. 6 is a perspective view of an improved plow; Fig. 7 is a vertical sectional view, taken upon the line 7—7 of Fig. 9; Fig. 8 is a sectional view, taken substantially upon the line 8—8 of Fig. 5; Fig. 9 is a view in elevation, partly in section, of various operating instrumentalities; Figs. 10, 11, 12 are sectional views taken substantially upon the lines 10—10, 11—11, and 12—12, respectively, of Fig. 9; Figs. 13 and 14 are detail views of a portion of the mechanism illustrated in Fig. 9, showing the parts in successively assumed positions; Fig. 15 is a fragmentary plan view, partly in section, of the gaging, snipping, feeding and folding instrumentalities; Fig. 16 is an elevational view of the same, partly in section; Fig. 17 is a vertical sectional view of the same, taken substantially upon the line 17—17 of Fig. 15; Fig. 18 is a similar vertical sectional view, taken substantially upon the line 18—18 of Fig. 15; Figs. 19, 20 and 21 are views similar to Figs. 15, 16 and 17, respectively, illustrating the operation upon the concave edge of a piece of stock; Fig. 22 is a diagrammatic view illustrative of the method of the present invention; Fig. 23 is a fragmentary view of a folded upper; Fig. 24 is an elevational view, partly in section, showing the relative positions assumed by the feed point, the plow, the fold presser and the retainer at the commencement of the feeding operation; Fig. 25 is a similar view in vertical section, taken substantially upon the line 17—17 of Fig. 15; Fig. 26 is a diagrammatic view of the diagonal block and its operating eccentric in their relative positions corresponding to the showing of Figs. 24 and 25; Figs. 27, 28 and 29 are views similar to Figs. 24, 25 and 26, respectively, illustrating the parts in their relative positions after the eccentric has been rotated through an angle of sixty degrees; and Figs. 30 to 41 inclusive are similar views, showing the parts in various other successively assumed positions. The sectional views are in all cases taken looking in the direction of the arrows.

The invention is illustrated in its preferred form as applied to a folding machine for folding over the edges of shoe uppers, such as shoe vamps. A sheet of flexible material, like the shoe upper 2, Fig. 17, is adapted to be gripped between a lower feed block 4 and an upper feed point 6 and fed or advanced thereby over a platform or support 8 to a folder, shown as a fold presser 10 (Fig. 18), which presses down a fold 12 in the edge of the upper. The terms "fold presser" and "folder" will hereinafter be employed interchangeably.

In order that the concave edges of the upper, like the edge 14 of Fig. 19, may fold as smoothly and uniformly as the straight and the convex edges, it is customary to snip the concave edges before folding. It has been found that snips of uniform length are objectionable because the fold bunches and wrinkles at the points where the snipping commences and ends. In order to obtain the best results, therefore, the snips should vary progressively along the curve being at first very short at the beginning of the concave edge, shown at 16, Fig. 23, increasing to a maximum at about the centre 18 of the curve, and then decreasing until the end 20 of the curve is reached, where they become very short again.

The desired result is attained, according to the present invention, by moving the concave edge of the vamp or other upper progressively into and out of the path of a continually operating snipping cutter. The snips thus vary progressively in the manner described above. In the specific embodiment of the invention which is herein illustrated and described, the straight and the convex edges of the vamp are advanced to the fold presser 10 along a straight line path, indicated in Figs. 15 and 22 by the numeral 22. This line is the same as the line of the fold when the edge is straight. While it is so advanced, the edge is bent out of the plane of the vamp, as shown at 24, Figs. 16 and 22, by a stationary projection 26, into the vertical plane through the straight-line path 22. The concave edges, however, are advanced along paths converging to the fold presser from points to the right of the edge 24, as diagrammatically shown in Fig. 22. Two of these paths are shown at 23 and 25. To the attainment of this end, the plane of the vamp is raised, so that the concave edge portions are permitted to ride over the projection 26, as shown in Fig. 20, into the path of the above-referred-to, continually operating, snipping cutter, shown at 28. The cutter 28 operates at very high speed, though preferably geared to operate at half the speed of the feed mechanism. The projection 26 happens to be shown as a shoulder upon a stationary cutter 30 (Fig. 16) for cooperating with the cutter 28 to snip the edge of the vamp before it is advanced to be folded. The length of the snip will obviously depend upon the amount by which the vamp edge rides over the stationary knife 30, into the path of the knife 28, so that snips of progressively varying length may be obtained by permitting the bent edge 24 to ride progressively over the stationary knife as the upper is advanced to the fold presser. The preferred instrumentalities for bringing this about will now be described.

The platform or support 8 normally occupies the position indicated in Figs. 2 and 16. When the support occupies this position, the vamp may be advanced by the feed block 4 and the feed point 6, with the bent edge 24 (Fig. 16) in contact with the projection 26, as above described, along the path 22 (Figs. 15 and 22). The upper is furthermore prevented from intersecting the path of the cutter 28 (Fig. 16) by a gage 32, which also determines the dimensions of the bent-over edge 24. The support 8 (Fig. 2), with the below-described mechanism carried thereby, is pivotally mounted in the frame 34 of the machine about axially disposed bolts 36 (Figs. 1, 2, and 3). A depending ear 38 (Fig. 2) from the support carries a pin 40 adapted to lie in an open slot 42 provided at one end of a bell-crank lever 44 that is pivoted to the frame 34 at 46. The bell-crank lever 44 is adapted to be pivotally actuated by a treadle (not shown) through a treadle link 48 connected to the other end 50 of the bell-crank lever. The bell-crank lever is normally maintained in the illustrated position, Fig. 2, by a compression spring 52 surrounding a rod 54, one end of which is pivotally mounted at 56 (Fig. 4) in an abutment upon the frame of the machine and the other end of which is loosely secured to the bell-crank lever, as shown. The compression spring 52 is confined between a pin 58 mounted through the rod 54 in a recess of the bell-crank lever, as shown, and a pivot collar 59 at the other end of the rod. When a concave edge 14 (Fig. 19) of the vamp is reached, the treadle will be depressed by the operator, actuating the bell-crank lever about its pivotal point 46, (Fig. 2) the wall of the slot 42 acting as a cam upon the pin 40 to tilt the support 8 upwardly about the pivotal bolts 36. The support 8 will thus be moved upwardly from the position shown in Fig. 16, to a degree dependent upon the degree of depression of the treadle, into a position illustrated in Fig. 20. The bent edge 24 (Fig. 16) of the vamp will thus be freed from the constraining influence of the projection 26, and will by its own flexibility ride over this projection on to the stationary cutter 30. The edge 24 will then intersect the path of the moving cutter 28 and will be snipped by the cooperative action of the cutters 28 and 30. The length of the snip will depend upon the amount by which the edge 24 rides over the shoulder 26 upon the stationary cutter 30, this will depend upon the height to which the support 8 is lifted and this, in turn, upon the degree of depression of the treadle. By progressively depressing and then progressively releasing the treadle, therefore, the operator may effect snips of progressively increasing and then progressively decreasing length in the edge of the vamp as the vamp is fed forward to the fold presser along a concave edge.

The gage 32 is provided with a slot 62 (Fig. 15) by means of which it may be adjustably secured to the support 8 through the action of a clamp screw 64. The gage is so adjusted in practice as to provide for a bentover edge 24 (Fig. 16) of dimensions just sufficient to yield a fold of the desired width. With the gage so adjusted, straight portions of the work may be guided without difficulty by the operator past the gage to the feeding instrumentalities. When a concave edge is reached, however, the operator must crowd the edge against the gage, otherwise he will find that the concave fold will be of smaller width than the fold along the straight and the convex edges. Because of the fact that the ordinary gage, when satisfactory for straight portions of the work, is unsatisfactory for curved portions, a great deal of stock is destroyed with present machines during the process of teaching inexperienced operators how to crowd the work properly against the gage, and even operators with experience often waste valuable uppers through improper manipulation.

Means are provided in the present machine for varying the effective portion of the gage in accordance with the contour of the vamp edge, so as automatically to do away with the necessity, found in all present-day machines, of crowding the work against the gage when concave edges are operated upon. To this end, the gage is inclined, as shown more particularly at 66 in Fig. 16, so that the upper portion 68 is normally effective, when straight and convex edges are gaged, and the lower parts 70 when the table is lifted for operation upon concave edges (Fig. 20). This results in providing for larger distances between the point where the vamp is gripped by the feeding instrumentalities and the effective portion of the gage when the table is lifted, so that it becomes unnecessary to crowd the work against the gage, as would be the case if the portion 70 of the gage remained effective throughout. Which portion of the gage is effective depends upon the amount by which the edge 24 is permitted to ride over the projection 26 on to the stationary cutter 30. Were it not for the projection or shoulder 26, the lower portion of the gage would be always effective. The angle of inclination of the gage and its shape may be so designed that simultaneously with the progressive snipping operation upon concave edge portions of the work, these edge portions will be progressively differently gaged. The operation of guiding concave edge portions may thus be rendered as simple as that of guiding other portions of the vamp. The provision of an automatically variable gage in a folding machine is considered to be a very important feature of the present invention.

It will be obvious that to secure the most efficient operation, the feeding-mechanism should remain idle while the fold presser is pressing down the fold, the fold presser should be ineffective during the forward feeding of the work, and the feeding mechanism should continue its control over the work until after the fold presser has operated to clamp the work to the support. If the feed mechanism continued to advance the stock after the fold presser had commenced to press down the fold, for example, the resulting fold would become very undesirably wrinkled. The mechanism by which the desired timing of the operating parts is attained will now be described. The lower feed block 4 is rigidly secured by a screw or similar member 74 (Figs. 2 and 5) to a rocking support 76. The rocking support is pivotally mounted upon the support 8 about a pivotal rod 78, secured to the frame of the machine by a screw 80 (Fig. 2). The rocking support 76 is provided with a diagonally disposed cylindrical opening 86 (Figs. 2 and 11) within which is mounted to slide a diagonally cylindrical block 88, the upper flat face of which is substantially horizontal, as shown at 90. The angle of inclination of the opening 86 is preferably in the neighborhood of thirty degrees. The cylindrical block 88 is adapted to be actuated by an eccentric 92 of a driving shaft 94 that is horizontally journaled in bearings in the support 8. The eccentric is rotatably mounted in the block 88 and extends through an opening 96 of the rocking support 76. Rotative movement of the shaft 94 will thus be converted by the eccentric into combined sliding and oscillating or rotative movement of the block 88, and this, in turn, will effect a rocking movement of the rocking support about the rod 78.

The feed point 6 is pivotally mounted at 98 upon the rocking support 76 so as to be rocked therewith and with the lower feed block 4, and is normally maintained in contact with the feed block by a leaf spring 100, one end 102 of which is secured to the support 8, as shown in Fig. 2, and the other end 104 of which presses down upon the body portion 106 of the feed point (Fig. 21). The body portion 106 is slotted, as shown in Figs. 2, 11 and 21 and a screw post 110 (Fig. 11) is adjustably clamped between the sides of the slot. The end 104 (Fig. 2) of the spring bears upon the screw post 110 to cause the feed point to engage the stock with varying pressure dependent upon the degree of adjustment of the screw post. The upper face 90 of the block 88 is adapted to engage the post 110, thereby to raise the feed point 6 in opposition to the pressure of the spring 100. The tension of the spring 100 may be adjusted by a clamp screw 112 (Fig. 7) having a shoulder 114 for engaging the spring. In order to prevent lateral movement of the spring, it is mounted in a longitudinal slot 116 provided in the upper surface of the support 8.

As the shaft 94 is rotated, the rocking support 76 is rocked from right to left and from left to right, as viewed in Figs. 4 and 11, imparting an oscillating movement to the lower feed block 4 and the upper feed point 6 which are carried thereby. During the left-to-right movement, the feed point 6 will be separated from the feed block 4 by the action of the cylindrical block 88, which then occupies its upper positions. During the right-to-left movement, the block 88 will lie in the lower portions of the cylindrical opening 86, and the feed point will be spring pressed into engagement with the feed block, which will thus advance to the fold presser the vamp or other shoe upper gripped therebetween.

The fold presser 10 is floatingly pivoted at 118 (Figs. 9 and 18) to a link 120 the other end of which is eccentrically connected by a pin 122 (Figs. 9 and 10) to a spiral gear 124 meshing with a spiral gear 126 upon the shaft 94. The fold presser and the feeding instrumentalities are thus operated from the same shaft 94. The exterior surface of the fold presser is cylindrical, as shown at 128 (Fig. 18), so as to rock within a cylindrical bearing 130 provided at the free end of an arm 132 the other end of which is pivoted at 134. By means of this double-pivoted, floating mounting of the fold presser at 118 and 134 (Fig. 18), its working face 136 may be raised from, or lowered towards the support 8. The face 136 is spring-pressed towards the support 8 by a compression spring 138 (Figs. 12 and 18) mounted upon a rod 140 extending through an opening 142 (Fig. 12) in the arm 132 and screw threaded into the frame, as shown at 144 (Fig. 12). By means of the screw threads, the pressure of the spring upon the arm 132 may be adjusted, the ends of the spring being confined between the arm and the knurled head 146 upon the rod 140. This construction permits a yielding action of the fold presser upon the material, while permitting a positive separation of the fold presser from the work by the link 120. The double pivotal mounting of the fold presser and the yielding tension exerted by the spring 138 from behind the fold presser contribute to the ironing out effect produced by the working face 136, as described below.

Figures 33, 36, 39:
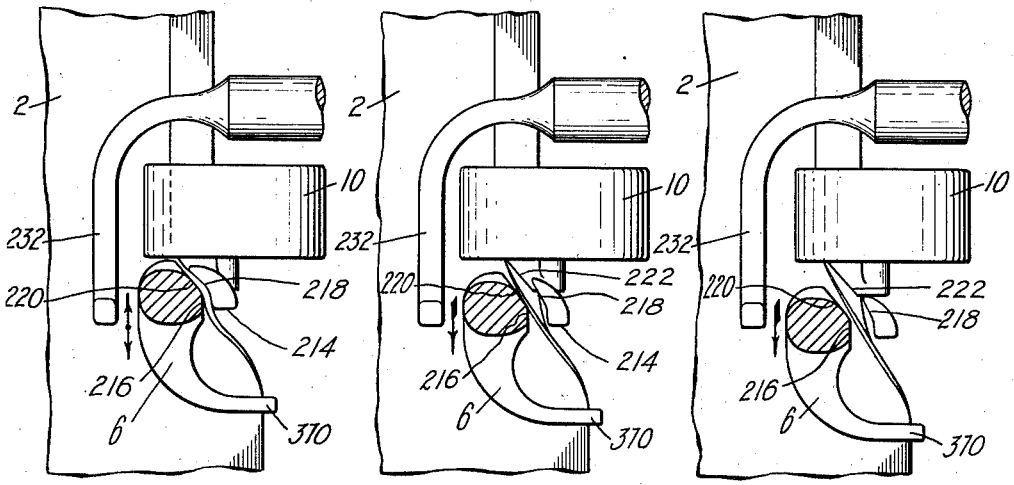
Figures 34, 37, 40:
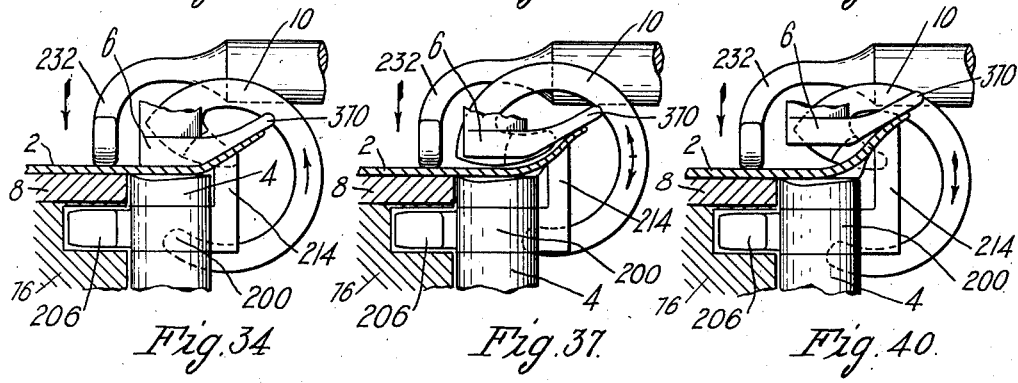
Figure 35:
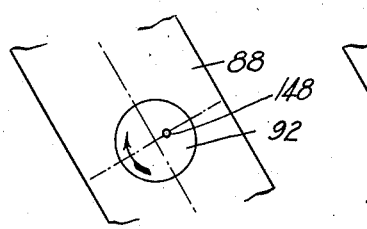
Figure 38:
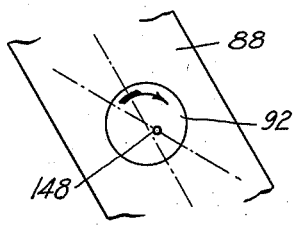
Figure 41:
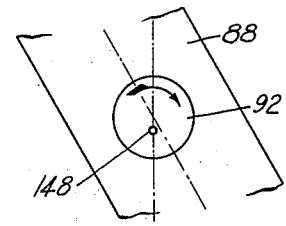

The timed relation between the operation of the feeding instrumentalities and that of the folder is illustrated in Figs. 24 to 41. The lower set of six figures diagrammatically represents the successive positions, sixty degrees apart, occupied by the eccentric 92 during the course of its cyle of movement in the direction of the arrow about the centre of rotation 148 of the shaft 94. The upper set of six figures illustrates, in plan, the positions correspondingly occupied by the operating elements and the middle set of six figures are elevational views, partly in section, of the parts shown in the upper figures. Initially (Figs 24 and 25), the feed point 6 is separated from the feed block 4 and the fold presser 10 is inactive, the stock 2 being at this time retained in position upon the support 8 by a retainer 232 hereinafter described. As the eccentric moves downwardly and to the right from the position of Fig. 26 to that of Fig. 29, the support 76 is rocked about the pivotal rod 78 towards the right, carrying the feed point and the feed block with it towards the right, or in the direction of the arrow, Fig. 27. At the same time, the downward movement of the block 88 permits the spring 100 to close the feed point in towards the feed block. The feed point continues to close in upon the feed block toward the positions of Figs. 31 and 34 to grip the stock, and advance it to the fold presser. The fold presser, meantime, has commenced to rotate in the direction of the arrow to grip and press a fold in the advanced stock. When the eccentric occupies approximately the position shown in Fig. 35, the limit of rocking movement of the rocking support 76 is reached, just preparatory to its return movement. At this moment, and for a small interval of time directly preceding and directly following, the feeding instrumentalities will be practically stationary. While they thus are idle or dwell, the fold presser engages the work. By reason of this timing of the parts, there can be no continued feeding movement during the operation of the fold presser, and a source of wrinkling and bunching of the folds is thus eliminated. Because of this dwell, furthermore, the feed point remains pressed down upon the work until after the fold presser has gripped it, the feed point thus retaining control over the work until after the fold presser has had an opportunity to relieve it of the necessity for such continued control. As the fold presser presses in further upon the fold, the feed point rises and then starts to return, as illustrated in Figs. 36 and 37. The feed point is thus not raised until after the fold presser has firmly secured the vamp to the support 8. The parts then assume positions illustrated in Figs. 39, 40 and 41, preparatory to a repetition of the above-described cycle of operations.

There is no great difficulty experienced in properly timing the operations of the feed elements and the fold presser for machines operated at low speed, because the desired result can easily be obtained by the use of suitably designed, spring-controlled cams; but cams are impractical in high-speed machines. According to the machine of the present invention, a very efficient high-speed machine is provided, with positive, all-lever connections, the elements of which operate in perfectly timed relation to one another.

The thirty degree inclination of the sliding block has been found in practice to be very convenient, permitting the fold presser to roll over through an angle of approximately 30 degrees before the feed point is raised, and serving also to increase the length of the dwell of the feeding mechanism. Other angular inclinations of the sliding block will yield results of varying value, influencing the length of the dwell and the amount of lifting of the feed point.

As the vamp or other upper is advanced by the feed block and the feed point to the fold presser, its edge encounters a plow 200 (Figs. 5, 6, 8 and 17) by which it is given an initial turn or fold during the forward feed movement. It is this initial fold that is later pressed down by the fold presser. The plow is provided with a vertical opening 202 (Fig. 6) whereby it may be horizontally pivotally mounted upon a pin 204 (Figs. 5 and 17) projecting from the feed block 4 upon the rocking support 76. The plow is provided with a tail 206 (Fig. 6) that is adapted normally, when the rocking support 76 (Fig. 5) occupies its extreme right-hand position, as viewed in Figs. 4 and 11, to be engaged by an adjustable stop 208 to maintain the plow in the position shown in Fig. 8. As the rocking support is moved to the left (Fig. 4), and the feed point and the feed block advance the vamp or other upper, the pivotal pin 204 is also moved in the same direction, along with the rocking support, a compression spring 210 (Fig. 8) that is mounted in a recess 212 engaging the tail to maintain it in contact with the stop 208. The body of the plow therefore pivots about the pivotal pin 204, with the result that the edge of the vamp becomes folded, and the lower portion of the folded edge becomes gripped, between an upstanding portion 214 (Fig. 6) of the plow and the interior side portion 216 of the feed point 6, as is shown in Figs. 19 and 33. At the same time, or shortly thereafter, an inwardly projecting portion 218, standing out from the upstanding portion 214, engages the upper portion of the folded edge and folds it further against a rearwardly inclined face 220 of the feed point 6. This further folding effect is found to some degree in the above-mentioned application by Brostrom and Ridderstrom, but in the present application, the upper portion of the folded edge is securely gripped between the feed point and the plow so that a more secure control is thereby attained upon the stock as it is advanced to the fold presser. The vamp is thus first gripped between the feed block and the feed point, and the edge is then folded and gripped between the side of the feed point and the plow, the plow folding the edge against the rear face of the feed point. The spring 210 provides for a very desirable yielding effect, so as not to injure portions of the vamp of greater than ordinary thickness. With the parts so positioned, the vamp is advanced to the fold presser.

The fold presser is provided with a diagonally offset edge 222 (Figs. 5 and 24) under which the initial fold is positioned by the advancing feed block, feed point and plow, and which operates immediately thereafter, while the feeding instrumentalities dwell, to pinch the material at the very edge of the fold, shown at 224 in Fig. 15. As the gage 32 operates, in the first place, to control the dimensions of the edge 24 (Fig. 16), as the plow maintains these dimensions unchanged while folding the edge over upon the feed point 6, and as the plow, after closing in upon the feed point, advances with the feeding instrumentalities to the very tip of the diagonal edge 222 of the fold presser, this edge 222 will pinch the fold at exactly the desired point, at the very edge 224 of the fold, and not to one side thereof. Hitherto creasers have sometimes been employed to crease out in advance the line of fold. Creasers are unreliable, however, because the material slips, so that the fold presser cannot be relied upon to press the fold along the previously creased line. The plow of the present application prevents slipping by holding the material firmly while it is pinched. The use of a creaser with all its attendant defects and uncertainties, is therefore eliminated. The present machine furthermore, is thus well adapted to the folding of all kinds of sheet material, not flexible sheets alone, like leather, but sheets of other kinds also, like cloth, with the use of which creasers have been found to be particularly unsuccessful; for the folding and feeding instrumentalities themselves determine the exact point at which the fold is made and the fold presser presses down the fold at exactly that predetermined point.

The plow thus cooperates with the upper feed point to clamp the material therebetween and to advance it to the diagonally projecting edge of the fold presser. The very edge 224 of the fold is then pinched by this portion of the fold presser, the remainder 226 (Fig. 15) of the fold remaining at this time unpressed. During the operation of the fold presser, the feeding instrumentalities and the plow dwell for a time, as described above, and then begin to retrace their paths of movement. In so retracing their movements, they release the vamp completely, thus avoiding the formation of wrinkles caused by the frictional binding upon the material of feed elements and plows now in use. In this respect, the plow is different in function from the plow of the above-identified application, in which the material is initially folded during the return movement of the plow. This difference in function is obtained in the present instance by a redesign of the parts involving a shifting farther to the right, as viewed in Fig. 8, of the pivotal pin 204 and suitable adjustment of the stop 208. By proper adjustment of the stop 208, indeed, it is possible to obtain a fold during the return movement of the plow, if such be desired. The forward feed movement is then repeated, the upper feed point and the plow cooperating to form another initial fold and to advance this new fold to the diagonal fold-presser edge 222. The previously pinched fold is thus advanced by the next feeding movement under the main portion 228 (Fig. 15) of the fold presser, by the face 136 of which the fold is pressed down. The working face 136 of the fold presser is cylindrical or otherwise curved, as shown in Figs. 18 and 25. By means of this construction, and by reason of the doubly-pivotal, floating mounting of the fold presser, and the action thereon of the cylindrical bearing 130, the previously pinched portion, at the very edge of the fold, will first be pressed, the remainder of the fold becoming progressively ironed out inward as the cylindrical face 136 rolls thereover. This is a distinct improvement over fold pressers at present employed, the working faces of which hammer down the fold at a single blow. The relative yielding between the fold-presser face 136 and the anvil 230 with which it cooperates, made possible by the above described spring 138 acting from behind the working face 136, relieves the strain commonly encountered at places, such as seams, where the fold is of greater than uniform thickness and eliminates the possibility of damage at these points. The attainment of this end is further aided by the fact that the edge of the fold is initially pinched while the remainder 226 of the fold is yet unpressed, as explained above.

The portion of the face of 136 of the fold presser that engages the edge of the fold is cut away, as shown at 231, Fig. 5 to provide an opening into which concave portions of the vamp advance, following the folding operation, as shown in Fig. 19. The cut-away portion does not interfere with the pressing down of the fold for the reason that so little of the vamp is advanced at any one feed movement that it may be completely folded by the active portion of the face 136.

Another important feature of the present invention resides in the method of, and the mechanism for, controlling the turning of the material in its plane when curved portions of the work are operated upon. According to the present invention, the material can be turned neither about the fold presser as a pivot nor about the feed point, but only about a point somewhat removed from the fold presser, and which is determined by a retainer 232, shown in front elevation in Fig. 4. Furthermore, no turning of the material is at all possible, even about this point, except at predetermined moments, at which moments the retainer presses less heavily upon the material to permit such turning. The mechanism for accomplishing this result will now be described.

A reduced portion 233 (Figs. 9 and 12) of the retainer is loosely mounted within a longitudinal groove in an end of a shaft 234 (Figs. 3 and 9) that is rockingly mounted in bearings 236 and 237. The retainer is yieldingly actuated towards the support 8 by a long spring 235 one end 239 of which is secured to the shaft 234 at 241 and the other end of which is secured to the retainer. A long spring produces a more uniform tension upon the retainer than would a short stiff spring, but is liable to lag behind the other operating mechanisms in a high-speed machine. In order to prevent such lag, a shoulder or abutment 243 is provided on the shaft 234, which an intermediate portion of the spring may engage during part of the cycle of movement of the retainer. The shoulder 243 operates to lift the spring and the retainer controlled thereby sooner than would otherwise be the case, so that the desirable effects of the long spring are thus obtained with the properly timed movement of a short spring.

A pin 238 is transversely, fixedly secured to the other end of the shaft and is connected by a ball-and-socket connection to a link 240 (Figs. 3 and 10). The other end of the link 240 is similarly connected by a ball-and-socket connection to one arm of a bell-crank lever 242 that is pivoted to the frame of the machine at 244 (Fig. 9). The other arm of the bell-crank lever 242 is connected by a link 246 (Fig. 10) to the pin 122 by which the link 120 (Fig. 9) is eccentrically connected to the gear 124. The retainer is thus operated in timed relation to the folding and feeding instrumentalities through the gear 126 that is mounted upon the shaft 94 (Fig. 10). As the gear 124 is rotated throughout a complete revolution to effect the operation of the fold presser through the pin 122 and the link 120, the bell-crank lever 242 will cause the link 240 to rock about the pin 239 towards the left, as viewed in Fig. 9, to and past the dead-centre point (Figs. 13 and 14), and back to its original position. As the pivotal point 244 is fixed, the link 240 will be carried upward during its rocking movement, causing the pin 238 to rock the shaft 234. The shaft 234 will be rocked to its limiting position when the link 240 reaches the dead-centre point (Fig. 13), but owing to the resilient mounting of the retainer upon the shaft 234, the retainer will operate to press down upon the vamp in the direction of the arrow, Figs. 34, 37 and 40, for a period of time preceding and following the attainment of the dead-centre point by the link 240. During this period, the fold presser operates to press the fold, the feed point 6 thereupon rises to release the work, and the fold presser and the feed elements start to return to their initial positions. As the link 240 passes beyond the dead-centre point, the retainer presses a little less heavily upon the work, and at this moment, after the fold presser has risen, and before the feed elements have completely returned to their starting points, the vamp may be turned in its plane, about the retainer as a pivot. The link then again reaches the dead-centre point, on its return movement, causing the retainer again to grip the vamp solidly before the feed point again grips the vamp. The vamp is thus maintained firmly in position at the moment when it is gripped by the feed point, so that its displacement at such time is prevented. As the vamp edge is maintained at an angle, as shown in Fig. 40, the feed point in coming down, would tend to push the vamp away were it not for the retainer. After the feed elements close in upon the vamp to feed it forward again, the link 240 moves so as to release the retainer, so that the feeding movement may commence again without interference. By means of this construction, therefore, the retainer presses hard upon the vamp, to prevent its being pushed outwardly, during the pressing down of the fold, but presses lightly at another time to permit the vamp to be turned. Not only is the retainer thus adapted to press lightly and heavily when desired, but, by means of the dead-centre structure, it is rendered operative over a comparatively long period of time.

The retainer thus serves the double function of preventing the work being pushed outwardly away from the fold presser and of controlling the turning movement of the material in its plane.

A hand and balance wheel 300 (Fig. 2) is keyed upon the outer end of the shaft 94 and is provided with a clutch face 302 that is adapted to be frictionally engaged by a clutch face 304 of a loose driving cone pulley 306. The clutch faces 302 and 304 are normally separated by a spring 308 mounted within a pocket 310 of the pulley 306. The spring 308 tends to maintain the pulley 306 against a stop shoulder upon a bearing collar that is slidably mounted upon the shaft 94 according to a well-known construction. The pulley may be actuated towards the wheel 300 to cause frictional engagement of the clutch faces by a bell-crank lever 60 pivoted at 314 and operable through a treadle (not shown) connected to the bell-crank lever 60 by a link 315. According to whether this treadle is depressed more or less, the clutch faces will engage more or less firmly, thus providing for varying the speed of the machine. Curved portions especially of the work, should be advanced by very short feed steps, so that only a small portion of the edge may be folded at any one time, and a better approximation thereby attained to a smooth curved edge fold. The feed steps of the present machine, for example, may be as short as four one-hundredths of one inch. In the interest of efficiency, therefore, the speed of the machine should be correspondingly high. Because of the above-described, positive, all-lever connections, the speed may be as high as desired, say, 4000 revolutions per minute, without in any way affecting the accuracy of operation. Upon the release of the treadle, the bell-crank lever 60 will be returned to its illustrated, ineffective position (Fig. 2) by a compression spring 316 mounted upon the rod 317 between a collar 318 at the bottom of the rod and a shoulder 320 in a pocket 322 of the bell-crank lever 60. The rod 317 is pivotally mounted in an abutment 319. At the same time, the spring 308 will separate the clutch faces 302 and 304, and a brake 324, that is also pivoted at 314, will be acted upon by a lug integral with the bell-crank lever 60 to stop the rotative movement of the clutch element 300 and the shaft 94. By virtue of this construction, furthermore, the pulley 306 and the clutch element 300 may be dismounted from the shaft 94, the pivotal bolts 36 may be loosened, and the support 8, which comprises a frame having integral therewith an oil tank 321 within which are mounted the gear and other parts for operating the folding and snipping mechanisms, as also the shaft 94 and the folding instrumentalities carried thereby, may be bodily removed as a unit from the frame 34 for repair purposes or for the purpose of remounting in another frame.

It will be noted that the cutters 28 and 30 will not be removed with the support 8. The cutter 30 is directly supported by the frame 34 upon a bracket 29 which may be secured to the frame by a bolt 31 and it may be adjusted upon the bracket by means of a slot-326-and-screw-328 connection (Figs. 4 and 8), and the cutter 28 is similarly adjustably mounted upon the end of an arm 330 (Fig. 2) that is pivoted at 332 to, and lies within, a hollow curved, overhanging portion of the frame of the machine and that is eccentrically connected by a link 334 to a gear 336 meshing with the gear 126 upon the shaft 94. The gear 336 is double the diameter of the gear 126 so that the cutter 28 may operate at half the speed of the shaft 94.

Before the machine is started, it is sometimes desirable, especially when operating upon closed vamps, that the feed point 6 should be separated from the feed block 4 to permit the insertion of the vamp above the feed block 4. A preferred construction for effecting this result is illustrated in Fig. 2. The support 8 rests upon the knurled head 338 of a screw 340 that is screwed into the frame of the machine and that may be adjusted up or down to pivotally raise or lower the support about the pivotal bolts 36. The support is normally maintained in its lowest position by the spring 52 acting through the bell-crank lever 44 upon the pin 40. A spring-pressed plunger 342 is adapted to enter any one of a number of notches 344 to secure the screw 340 in adjusted position. A rod 346 (Figs. 2 and 12) rests lightly upon an adjustable screw 348 that may be secured in adjusted position upon the frame by a screw 350 and extends through an opening 352 in the support 8, an opening 354 in the rocking support 76 and an opening in the rod 78. A rod 356 is vertically disposed in an opening 358 in the rocking support 76 and rests upon the head of the rod 346. As the height of the top of the rod 356 is determined by the adjustment of the adjustable screw 348, the feed point 6 will remain in its illustrated position (Fig. 2) independently of the adjustment of the screw 340. The support 8, with the feed block 4 carried thereby, may therefore be lowered away from, and raised towards, the feed point 6 by rotation of the knurled head 338 to separate the feed elements and to bring them together, as desired. In practice, the support is adjusted so that the feed point is separated from the feed block, the block being moved up into engagement with the feed point, in operation, by a light pressure maintained upon the support treadle.

In order that the interior front of the machine may be exposed to view, the frame should be open at the front. A separable cap 362 (Figs. 2 and 4) is provided which may be secured to the frame of the machine by screws 364 to protect the parts enclosed therein. This construction is preferable to an integral frame structure. The top of the cap 362 is visible in Fig. 4 through a break in a table 366 that is provided with rearwardly extending arms that straddle the frame of the machine and that are pivoted at 368 upon an axis at the far rear of the machine, so that the table 366 may readily be pivotally lifted out of the way when desired, as indicated by dotted lines in Fig. 1. The position of the table 366 may be adjusted by means of adjustably threaded posts upon which it rests, shown clearly in Fig. 4.

The operation of the machine will readily be understood from the foregoing description, but may be summarized briefly as follows: It may be assumed that the feed elements initially occupy their extreme position to the right, as viewed in Fig. 4, so that the plow is ineffective and the retainer and the fold presser are necessarily raised. The parts will occupy the relative positions shown in Figs. 24 and 25, except that the retainer, in Fig. 25, has not quite been raised. It may be assumed further that both treadles are released, so that the machine is stationary and the support 8 occupies its lowest position, the feed point being thus raised above the support. A piece of stock may be inserted between the feed point 6 and the feed block 4. One of the treadles may now be slightly depressed to operate the bell-crank lever 44 and thus raise the support 8 towards the feed point. The shaft 94 may be set into operation by the other treadle, whereupon the feed elements will grip the stock (Fig. 28) and will commence to move therewith towards the left, as viewed in Fig. 4. In order that the edge of the stock may be maintained in position against displacement or buckling just to the rear of the feed elements, the feed point 6 is provided with a rearwardly and inwardly projcting finger 370 (Figs. 4 and 15). As the feed elements advance, the operator guides the edge of the stock against the gage 32 in preparation for the next gripping action of the feed elements. Previous to this gripping action, the edge, if concave, has been snipped with snips of progressively varying length, as described, through the further depression of the treadle (not shown) that controls the support 8; if the edge is straight or convex, it has been advanced at one side of the cutters 28 and 30 and has been gripped by the feed elements unsnipped. As the feed point and the feed block advance the stock, the plow, moving with the feed block, pivots about the pin 204 (Figs. 30 and 33) to grip the edge of the stock between its face 214 and the inner side face of the feed point, and to fold the edge over upon the diagonally inclined face 220 of the feed point. Upon reaching the end of the feed movement, the feed elements and the plow dwell for a time (Fig. 33), during which the retainer operates to clamp the vamp to the support (Fig. 34). Immediately following upon this operation of the retainer, the diagonal edge 222 of the fold presser pinches at a predetermined point the fold previously formed between the plow and the feed point and the working face 136 of the fold presser then irons out a previously pinched fold (Fig. 37). Just before the end of the fold-pressing operation, the feed element 6 rises. The fold presser, the feed elements and the plow commence returning towards their initial positions (Figs. 36, 37, 39 and 40). The vamp is completely released during such return movement. The retainer during all this period, presses down hard upon the vamp (Figs. 37 and 40) to prevent its being pushed outwardly away from the operating instrumentalities. Before the feed elements and the plow reach their initial position, the retainer rises just a little so as to exert some clamping effect upon the vamp, sufficient to maintain the vamp in position, yet light enough to permit the operator's turning the material about the retainer as a pivot. It becomes thus possible to turn the vamp during the time that the fold presser and the feed elements are inoperative. The retainer then again presses down hard upon the vamp to prevent the feed point pushing the vamp away when closing in upon the feed block. The feed elements once again grip the material (Fig. 28) in preparation for a renewal of the above-described cycle, the retainer rises, and the feed elements move forward to advance the vamp again. The machine may be stopped at will by releasing the treadle (not shown) which controls the bell-crank lever 60.

In accordance with the present invention, therefore, provision is made for progressively snipping concave edges of the work with snips of progressively varying lengths according to a novel method and by far superior mechanisms. The customary crowding of the work at concave edges and the consequent destruction of much valuable stock by inexperienced operators is obviated through the provision of an automatically variable gage. The stock may thus be fed through the machine with comparatively little attention on the part of the operator. The operations are perfectly timed, the feed mechanism and the fold presser each operating at its predetermined moment while the other is at rest, and the feed mechanism not letting go of the work until after it has come under the control of the fold presser. The work is folded at the exact point desired, and not at some other point to the side thereof. A novel retainer grips heavily at one time upon the work to prevent its being pushed outwardly away from the operating instrumentalities and lightly at another time to permit the work being easily turned at the concave edges. The resulting fold is of a character unattainable with machines at the present day in use.

It will be understood that the embodiment of the invention hereinbefore described and which is shown in the drawings is illustrative purely and not restrictive, and that modifications may be made therein by the skilled artisan without departing from its spirit and scope as defined in the appended claims.

What is claimed is:

1. The method of treating flexible sheet material which comprises advancing the material in the plane of the sheet with the edge of the material bent out of said plane, relatively moving the edge of the material toward the plane of the sheet, and then cutting the edge of the material.

2. The method of treating material which comprises advancing the material along a predetermined path, moving the material out of said path when it is desired to cut the material, and cutting the material so moved out of said path to a degree dependent upon the degree of displacement of the material from said path.

3. The method of treating material which comprises advancing the material along a predetermined path, progressively moving the material out of said path, and progressively cutting the material with cuts of progressively varying length dependent upon the degree of displacement of the material from said path.

4. The method of folding flexible sheet material which comprises feeding the material in the plane of the sheet in a predetermined path of feed, folding portions of the material as they are successively fed, moving the material to one side of the path at an angle to the said plane, snipping portions of the material so moved to one side, and folding the snipped portions of the material.

5. The method of folding flexible material which comprises feeding the material to a predetermined point along either of two non-parallel paths of feed, snipping the material when it is advanced along one of the paths, and folding the material when it reaches the predetermined point.

6. The method of folding flexible material which comprises advancing the material to a predetermined point along any one of a plurality of predetermined paths, snipping the material to a degree dependent upon which of said paths it occupies, and folding the material when it reaches the predetermined point.

7. The method of folding flexible material which comprises advancing the material to a predetermined point along a predetermined path, progressively moving the material out of said path, progressively snipping the material with snips of progressively varying length dependent upon the degree of displacement of the material from said path, advancing the snipped material to the predetermined point, and folding the material when it reaches the predetermined point.

8. The method of folding flexible sheet material which comprises advancing the material in the plane of the sheet with the edge of the material bent out of said plane, folding the advanced edge of the material, relatively moving the unadvanced bent edge of the material toward the plane of the sheet, snipping the moved edge of the material, and folding the snipped edge of the material.

9. The method of folding flexible sheet material which comprises advancing the material in the plane of the sheet with the edge of the material bent out of said plane, folding the advanced edge of the material, progressively relatively moving the unadvanced bent edge of the material toward the plane of the sheet, progressively snipping the moved edge of the material with snips of varying length dependent upon the degree of movement of the bent edge toward the plane of the sheet, further advancing the material, and folding the advanced snipped edge of the material.

10. The method of folding flexible material that comprises folding the material, pinching the material at the edge and margin of the fold only, and progressively engaging the successive portions of the folded material from the edge of the fold inward to progressively press the said successive portions from the edge of the fold inward.

11. The method of folding flexible material, that comprises folding successive portions of the material, pinching the successively folded portions of the material at the edge and margin of the fold only, and progressively engaging the successive portions of the successively folded portions from the edge of the fold inward to progressively press the said successive portions of the folded portions from the edge of the fold inward.

12. The method of folding flexible material that comprises feeding the material, folding successive portions of the margin of the material, pinching the successively folded portions of the material at the edge and margin of the fold only when the said successively folded portions reach a predetermined position in the path of feed, and progressively engaging the successive portions of the successively folded portions from the edge of the fold inward to progressively iron the said successive portions of the folded portions from the edge of the fold inward.

13. A machine of the class described having, in combination, a cutter for a piece of material that is adapted normally to be fed in a normal path to one side of the path of operation of the cutter so as not to be cut by the cutter, means for operating the cutter in the said path of operation, a cooperating cutter situated in the said path of operation, and means for moving the material, while it is fed, at an angle to its normal path of feed, into the said path of operation of the cutter, so as to permit its being cut by the cutters.

14. A machine of the class described having, in combination, a support for a piece of flexible material, a projection, a cutter to one side of the projection, means for feeding the material over the support with the edge of the material engaging the projection so as to be bent thereby out of the path of the cutter, and means for moving the edge of the material over the projection into the path of the cutter.

15. A machine of the class described having, in combination, a movable support for a piece of flexible material, a stationary projection, a cutter to one side of the projection, means for feeding the material over the support with the edge of the material engaging the projection so as to be bent thereby away from the cutter, and means for moving the support so as to cause the edge of the material to ride over the projection and into the path of the cutter.

16. A machine of the class described having, in combination, a cutter, means for feeding material, a movable support for the material adapted to move the material into the path of the cutter, and means for simultaneously adjusting the support and the feeding means.

17. A folding machine having, in combination, two cooperating cutters, means for operating one of the cutters in a path towards and from the other cutter, a fold presser, means for feeding a piece of material to the fold presser along a path at one side of the line along which extends the path of operation of the said one cutter, and means for moving the material into the said path of operation of the said one cutter before it is fed to the fold presser.

18. A folding machine having, in combination, a cutter, a fold presser, means for feeding a piece of material at one side of the cutter to the fold presser, and means for progressively moving the material into the path of the cutter before it is fed to the fold presser, whereby the material may be cut with cuts of progressively varying length before it is folded.

19. A folding machine having, in combination, a movable support for a piece of flexible material, a fold presser, a cutter, a projection adapted to be engaged by the edge of the material to cause the said edge to be bent out of the path of the cutter, means for feeding the material over the support to the fold presser, and means for moving the support so as to cause the edge of the material to ride over the projection and into the path of the cutter.

20. A folding machine having, in combination, a movable support for a piece of flexible material, a fold presser, a continually operating, movable, snipping cutter, a stationary snipping cutter cooperating therewith having a portion adapted to be engaged by the edge of the material to cause the said edge to be bent out of the path of the movable cutter, means for feeding the material over the support to the fold presser, and means for progressively moving the support so as to cause the edge of the material to ride progressively over said cutter portion into the path of the movable cutter, whereby the edge of the material may be snipped with snips of varying length before it is folded.

21. A folding machine having, in combination, a treadle actuated, progressively upwardly and downwardly moving support for a piece of flexible material, a fold presser, an upper, continually operating, movable snipping cutter, a lower stationary snipping cutter cooperating therewith the lower portion of which is adapted to be engaged by the edge of the material to cause the said edge to be bent upwardly out of the path of the movable cutter, and means for feeding the material over the support to the fold presser, the progressively upward and downward movement of the support causing the edge of the material to ride progressively over the stationary cutter into the path of the movable cutter, whereby the edge of the material may be snipped with snips of progressively increasing and decreasing length before it is folded.

22. A machine of the class described having, in combination, a cutter, a variable gage, and means for varying the gaging action of the gage in accordance with the effectiveness or the ineffectiveness of the cutter.

23. A machine of the class described having, in combination, means for feeding material of varying edge contour, a variable gage adapted to be engaged by the edge of the material, and means whereby different portions of the gage may be rendered effective to variably gage edges of different contour.

24. A machine of the class described having, in combination, a cutter adapted to operate upon the edge of a piece of material, a variable gage adapted to be engaged by the edge of the material, and means whereby different portions of the gage may be rendered effective to variably gage edges of different contour.

25. A machine of the class described having, in combination, a cutter adapted to operate upon the curved or the straight edge of a piece of material, a variable gage adapted to be engaged by the edge of the material, and means whereby one portion of the gage may be rendered effective to gage straight or convex edges in one manner, and another portion of the gage may be rendered effective to gage concave edges in another manner.

26. A folding machine having, in combination, a fold presser, a variable gage, means for advancing a sheet of material to the fold presser with the edge of the material in engagement with the gage, and means whereby different portions of the gage may be rendered effective to variably gage edges of different contour.

27. A folding machine having, in combination, a fold presser, a continuously operating cutter, a variable gage, and means for advancing a sheet of material out of the path of the cutter to the fold presser along one portion of the gage, and for advancing the material to the fold presser along another portion of the gage in a path intersecting the path of the cutter.

28. A machine of the class described having, in combination, a feed block and a feed point for feeding material, and a single oscillatively operable, sliding means for operating both the feed block and the feed point.

29. A machine of the class described having, in combination, means for operating upon material, a feed block and a feed point for feeding the material to the operating means, and an eccentrically operable, diagonally sliding block for operating the feeding means.

30. A folding machine having, in combination, a fold presser, a feed block and a feed point for feeding material to the fold presser, and a sliding block for operating the feed block and the feed point.

31. A folding machine having, in combination, a fold presser, a rocking support having a diagonally disposed, cylindrical opening, feed means mounted upon the support, a diagonally cylindrical block slidingly mounted within the cylindrical opening, and means for oscillating and sliding the block to effect a rocking of the rocking support, whereby the feed means becomes effective to feed material to the fold presser.

32. A folding machine having, in combination, a fold presser, a rocking support having a diagonally disposed, cylindrical opening, a feed block rigidly secured to the support, a spring-pressed arm pivoted to the support over the opening having a feed point for cooperating with the feed block, a diagonally cylindrical block slidingly mounted within the cylindrical opening, and an eccentric for operating the block to rock the rocking support and actuate the feed-point arm in opposition to its spring.

33. A folding machine having, in combination, a rolling fold presser having a curved working face, means for advancing a sheet of material thereto with the margin folded over upon the sheet, means whereby a portion of the curved face engages the folded-over sheet at the edge and margin of the fold, and means for rolling the fold presser over the folded-over portion of the sheet from the edge of the fold inward.

34. A folding machine, having in combination, a support for a piece of flexible material, a fold presser having a curved working face and a diagonal pinching edge, means for feeding the material intermittently over the support, a plow for intermittently initially folding the material as it is fed, means for moving the plow to the end of said diagonal pinching edge, means whereby said diagonal pinching edge pinches the folded material at the fold adjacent to the plow, and means for rolling the fold presser over the folded portion of the sheet.

35. A folding machine having, in combination, a pivoted arm, a fold presser movably connected to the arm, an anvil cooperating with the fold presser to press a fold in the margin of a sheet of flexible material, and means connected to the fold presser for actuating the fold presser upon the arm towards and from the anvil the arm being adapted to pivot about its pivotal point to permit the fold presser to yield during its fold-pressing action.

36. A folding machine having, in combination, an arm pivoted at one end, a fold presser pivotally connected to the other end of the arm, an anvil cooperating with the fold presser to press a fold in the margin of a sheet of flexible material, means for pivotally actuating the fold presser upon the arm towards and from the anvil and means yieldingly engaging the arm to cause it to pivot yieldingly about its pivotal point, thereby effecting a yielding engagement of the material between the fold presser and the anvil.

37. A folding machine having, in combination, a frame, an arm pivotally connected to the frame, a fold presser connected to the arm, power-operated means mounted upon the frame, and means connecting the fold presser to the power-operated means to cause the power-operated means to actuate the fold presser while the arm is stationary, the arm being adapted to pivot about its pivotal point to permit the fold presser to yield during its fold-pressing action.

38. A folding machine having, in combination, a pivoted arm having a cylindrical bearing, a fold presser having an exterior cylindrical surface mounted within the bearing so as to rock therein, and means for rocking the fold presser.

39. A folding machine having, in combination, an arm pivoted at one end having a cylindrical bearing at the other end, a fold presser having a curved working face and an exterior cylindrical surface mounted within the bearing so as to rock therein, an anvil cooperating with the working face of the fold presser to press a fold in the edge of a sheet of flexible material, and means yieldingly engaging the arm to cause a yielding engagement of the material between the working face and the anvil.

40. A folding machine having, in combination, a frame, an arm pivoted thereto at one end having a cylindrical bearing at the other end, a fold presser having a curved working face and an exterior cylindrical surface mounted within the bearing so as to rock therein, power-operated means mounted upon the frame, and a link connecting the fold presser to the power-operated means.

41. A folding machine having, in combination, a fold presser for pressing a fold in successive portions of a sheet of material, means for feeding the material to the fold presser, and means for actuating the fold presser, the fold presser having a working face provided with two portions, one of the portions being constructed and arranged to engage the edge and margin of the fold only and the other portion to engage the remainder of the fold only, the first-named portion being rearward of the second-named portion in the line of feed so as to engage the fold before the material has been fed to the second-named portion, whereby a concave portion of the sheet is adapted to be turned to one side of the line of feed of a straight portion of the sheet after it has been engaged by the first-named portion and without being moved completely out of the range of action of the second-named portion.

42. A folding machine having in combination, a fold presser, means for feeding material to the fold presser, a retainer for preventing the material from being pushed outward away from the fold presser and for determining the point about which the material may be turned in its plane, a rocking shaft upon which the retainer is mounted, a lever for actuating the shaft, a link universally pivotally connecting the shaft and the lever, and means for actuating the link and the lever to and beyond a dead-center point and back to cause the retainer to press heavily upon the material, then less heavily to permit the material to be turned, then heavily again before releasing the material.

43. The method of folding flexible material having variable edge contour which comprises advancing the non-concave edges of the material in a predetermined path, folding portions of the material as they are successively advanced, moving the concave edges of the material to one side of the path, snipping the margins along the concave edges of the material so moved to one side, and folding the snipped portions of the material.

44. A machine of the class described having, in combination, two cooperating cutters, means for feeding material past the cutters along a path of feed to one side of the cutters so that the material may not be cut by the cutter, and means for moving the material into the path of the cutters so as to permit its being cut by the cutters.

45. A machine of the class described having, in combination, a support for a piece of flexible material, a cutter, means for feeding the material over the support past the cutter with the edge of the material bent out of the path of the cutter, and means for moving the edge of the material into the path of the cutter.

46. A machine of the class described having, in combination, a movable support for a piece of flexible material, two cooperating cutters, means for feeding the material over the support past the cutters along a path to one side of the cutters, and means for moving the support so as to cause the edge of the material to ride into the path of the cutters.

47. A folding machine having, in combination, a shaft, a retainer loosely mounted thereon, a long spring secured at one end to the retainer and at the other end to the shaft, and a shoulder adapted to be engaged by an intermediate portion of the spring.

48. A folding machine having, in combination, a frame, and mechanism for feeding and folding the margin of sheet material mounted in the frame and removable as a unit from the frame.

49. A folding machine having, in combination, a fold presser, means for feeding material to the fold presser, a variable gage for gaging the material, and means for automatically varying the effectiveness of the gage.

50. A folding machine having, in combination, a moving support for a piece of flexible material, a fold presser, a cutter, a variable gage, means for advancing a sheet of material over the support to the fold presser along one portion of the gage out of the path of the cutter, and means for moving the support to cause the advancing means to advance the material to the fold presser along another portion of the gage in a path intersecting the path of the cutter.

51. A folding machine having, in combination, a fold presser, an inclined gage, means for advancing a sheet of material to the fold presser with the edge of the material in engagement with the gage, and means whereby different portions of the gage may be rendered effective to gage edges of different contour.

52. A machine of the class described having, in combination, a frame, a support removably secured thereto comprising an oil tank, operating mechanism carried by the support, and mechanism for operating the operating mechanism mounted in the oil tank.

53. A folding machine having, in combination, a frame, a cutter mounted thereon, a support removably secured thereto comprising an oil tank, folding mechanism carried by the support, and mechanism for operating the folding mechanism mounted in the oil tank, whereby the support and the folding mechanism carried thereby may be bodily removed as a unit from the frame.

54. A folding machine having, in combination, a fold presser and means for feeding material thereto comprising a pivoted feed point, means adjustably secured to the feed point, and a leaf spring for engaging the adjustably secured means to cause the feed point to engage the material with varying pressure.

55. A folding machine as defined in claim 54 in which the leaf spring is held against lateral movement.

56. A machine of the class described having, in combination, means for intermittently feeding material, means moving with the material and folding it during the feeding movement, and means whereby the second-named means completely releases the material during the return movement.

57. A machine of the class described having, in combination, means for feeding material, a plow adapted intermittently to move with the material and to fold the edge thereof during the feeding movement, and means whereby the plow completely releases the material during its return movement.

58. A folding machine having, in combination, a fold presser, intermittently operable means for feeding material thereto, a plow movable with said means adapted to fold the material during the feeding movement, and means whereby the plow completely releases the material during the return movement of the plow.

59. A folding machine having, in combination, a fold presser provided with an offset edge, a feed block and a feed point intermittently operable to feed material to the offset edge, a plow movable with the feed block and the feed point adapted to fold the material against the feed point during the feeding movement, thereby determining the portion of the material that is to be operated upon by the offset edge, and means whereby the feed block, the feed point and the plow completely release the material during their return movement.

60. The method of folding material which comprises intermittently feeding material, folding it during the feeding movement, pressing down the fold so formed, and completely releasing the material during the intervals between the intermittent feeding movements.

61. A folding machine having, in combination, a fold presser, means for advancing material thereto, means for cutting the material with cuts of progressively varying length, and means for variably gaging the material in accordance with the length of the cuts.

62. A folding machine having, in combination, a fold presser, means for advancing material thereto, and means for cutting the material with cuts of progressively varying length and for variably gaging the material in accordance with the edge contour of the material.

63. A machine of the class described having, in combination, a plow, means whereby the plow intermittently engages, moves with and folds a piece of material, means whereby the plow intermittently disengages the material and is thereupon retracted, and a fold presser for pressing the folded material.

64. A machine of the class described having, in combination, means for intermittently feeding material, a plow, means whereby the material is gripped by the feeding means and the plow, means for moving the plow with the feeding means and to cause the plow to fold the material, and means for intermittently separating the plow and the feeding means from the material and for retracting the plow and the feeding means.

65. A folding machine having, in combination, a fold presser, means for intermittently feeding material thereto, means adapted to engage the material and to move therewith towards the fold presser and fold it during said movement, and means for intermittently retracting said means and to disengage the material during the retraction.

66. A folding machine having, in combination, a fold presser, a feed point, a plow, means whereby the feed point and the plow grip material and move forward therewith towards the fold presser, means whereby the plow folds the material during the forward movement, and means for separating the feed point and the plow from the material and for retracting the plow and the feed point.

67. A folding machine having, in combination, a fold presser, a feed point for advancing material thereto, a plow, and means for moving the plow with the feed point to cause one portion of the edge of the material to become folded, and the folded edge gripped, between the feed point and a portion of the plow, and to cause another portion of the folded edge to become further folded between the feed point and another portion of the plow.

68. A folding machine having, in combination, a fold presser, a feed point for advancing material thereto, a plow having an upstanding portion, and means for moving the plow with the feed point to cause the edge of the material to become folded, and the lower portion of the folded edge to become gripped, between the plow and the feed point, and to cause the upstanding portion to fold the upper portion of the fold against the feed point.

69. A machine of the class described having, in combination, means for advancing material comprising a feed point and a plow movable therewith adapted to form a fold at a predetermined point in the material, and a curvilinear fold presser adapted to iron out the fold having an offset edge to which the predetermined point is advanced, whereby the offset edge pinches the fold at the predetermined point.

70. A folding machine having, in combination, an upward and downward moving support for a piece of flexible material, a fold presser, a cutter, an inclined gage, means for feeding the material over the support to the fold presser along the upper portion of the inclined gage out of the path of the cutter when the support is in a lowered position, and means for raising the support to cause the feeding means to feed the material to the fold presser along the lower portion of the inclined gage in a path intersecting the path of the cutter.

71. A folding machine having, in combination, a fold presser, a plurality of elements for feeding material to the fold presser, and a block constrained to slide in a diagonal path for operating the feed elements.

72. A folding machine having, in combination, a fold presser, means for advancing a sheet of material to the fold presser with the margin folded over upon the sheet, means whereby the fold presser is adapted to engage the folded-over sheet at the edge and margin of the fold only, and means whereby the fold presser is adapted to engage the successive portions of the folded-over portion of the sheet progressively from the edge of the fold inward to progressively press the said successive portions of the folded-over portion from the edge of the fold inward.

73. A folding machine having, in combination, a frame, a knife mounted on the frame, a support removably mounted in the frame, and mechanism for feeding and folding the margin of sheet material mounted in the support and removable with the support.

74. A folding machine having, in combination, a frame, a support pivotally mounted near the rear portion of the frame, folding mechanism mounted upon the support near the front portion of the frame, and means for pivotally actuating the support.

75. A machine of the class described having, in combination, a support, folding mechanism mounted upon the support, means for initially adjusting the support, and means for adjusting the support during the operation of the machine.

76. A folding machine having, in combination, a support having an opening, feed means mounted upon the support, a block slidingly mounted within the opening, means for oscillating and sliding the block to effect a movement of the support, whereby the feed means becomes effective to feed material, means for folding portions of the material, and means for pressing the folded portions.

77. A folding machine having, in combination, means for feeding material, a plow, a fold presser, means whereby the feeding means and the plow are adapted to grip the material intermittently between them and to advance with the material towards the fold presser, and means for separating the plow and the feeding means from the material at the end of each intermittent feeding movement and for thereupon retracting the feeding means and the plow from the fold presser.

78. A folding machine having, in combination, a fold presser having a curved working face, and means for actuating the fold presser to cause the curved working face to engage folded material at the edge and margin of the fold and to roll progressively over the folded material to press the folded material progressively from the edge of the fold inward.

79. A folding machine having, in combination, a pivoted member, a fold presser having a curved working face pivoted to the member, a portion of the curved face being adapted to engage folded material at the edge and margin of the fold, and power-operated means connected to the fold presser for pivotally actuating the fold presser about its pivotal connection to the member to cause the curved face to roll progressively over the folded material from the edge of the fold inward.

80. A folding machine having, in combination, means for feeding material, means for folding the material, and means for first engaging the folded material at the edge margin of the fold only and for then engaging the folded material progressively from the edge of the fold inward to progressively press the folded material from the edge of the fold inward.

81. A folding machine having, in combination, means for folding the margin of sheet material that is adapted to be fed through the machine, a fold presser having a curved working face a portion of which is adapted to engage the folded margin at the edge and margin of the fold, and means for actuating the fold presser to cause the curved working face to engage the folded margin at the edge of the fold and to roll over the folded margin from the edge of the fold substantially at right angles to the edge of the fold to press the folded margin progressively against the sheet from the edge of the fold inward.

82. A folding machine having, in combination, means for feeding material, a plow for folding the material, a fold presser having a curved working face to which the folded material is adapted to be fed by the feeding means, and means for actuating the fold presser to cause the curved working face to engage the folded material at the edge and margin of the fold and to roll progressively over the folded material to press the folded material progressively from the edge of the fold inward.

83. A folding machine having, in combination, means for feeding material, a plow for folding the material, a fold presser having a curved working face to which the folded material is adapted to be fed by the feeding means, the fold presser having an offset edge adapted to engage the folded material at the edge and margin of the fold, and means for actuating the fold presser to cause the curved working face to roll progressively over the folded material from the edge of the fold inward.

84. A folding machine having, in combination, a rock shaft, a retainer carried by the rock shaft, driving means, a lever having two arms one of which is connected to the driving means, a link connecting the other arm of the lever and the rock shaft, whereby the driving means is adapted to actuate the link and the said other arm of the lever to and beyond dead-center position and return, a fold presser, and a link connecting the fold presser to the driving means.

In testimony whereof, I have hereunto subscribed my name this 19th day of January, 1920.

ANDREW R. RIDDERSTROM.